US008442099B1

(12) United States Patent
Sederat

(10) Patent No.: US 8,442,099 B1
(45) Date of Patent: May 14, 2013

(54) CROSSTALK CANCELLATION FOR A COMMON-MODE CHANNEL

(75) Inventor: Hossein Sederat, San Jose, CA (US)

(73) Assignee: Aquantia Corporation, Milpitas, CA (US)

( * ) Notice: Subject to any disclaimer, the term of this patent is extended or adjusted under 35 U.S.C. 154(b) by 255 days.

(21) Appl. No.: 12/977,844

(22) Filed: Dec. 23, 2010

Related U.S. Application Data

(63) Continuation-in-part of application No. 12/551,396, filed on Aug. 31, 2009, now abandoned.

(60) Provisional application No. 61/173,394, filed on Apr. 28, 2009, provisional application No. 61/141,639, filed on Dec. 30, 2008, provisional application No. 61/141,640, filed on Dec. 30, 2008, provisional application No. 61/099,979, filed on Sep. 25, 2008.

(51) Int. Cl.
*H04B 1/38* (2006.01)

(52) U.S. Cl.
USPC ........... 375/219; 375/316; 375/220; 375/222; 375/346; 375/349; 375/260; 375/284; 375/285; 375/350

(58) Field of Classification Search .................. 375/316, 375/219, 220, 222, 346, 349, 260, 285
See application file for complete search history.

(56) References Cited

U.S. PATENT DOCUMENTS

| | | |
|---|---|---|
| 3,506,906 A | 4/1970 | Nestor |
| 3,671,859 A | 6/1972 | Miller |
| 4,797,902 A | 1/1989 | Nishiguchi et al. |
| 4,870,370 A | 9/1989 | Hedberg et al. |
| 5,157,690 A | 10/1992 | Buttle |
| 5,283,811 A | 2/1994 | Chennakeshu et al. |
| 5,550,924 A | 8/1996 | Helf et al. |
| 5,832,032 A | 11/1998 | Overbury |
| 5,889,511 A | 3/1999 | Ong et al. |
| 5,910,960 A | 6/1999 | Claydon et al. |
| 5,995,566 A | 11/1999 | Rickard et al. |
| 5,995,567 A | 11/1999 | Cioffi et al. |
| 6,011,508 A | 1/2000 | Perreault et al. |
| 6,035,360 A | 3/2000 | Doidge et al. |
| 6,052,420 A | 4/2000 | Yeap |
| 6,285,718 B1 | 9/2001 | Reuven |
| 6,385,315 B1 | 5/2002 | Viadella et al. |
| 6,424,234 B1 | 7/2002 | Stevenson |

(Continued)

FOREIGN PATENT DOCUMENTS

WO       WO 97/40587       10/1997

OTHER PUBLICATIONS

U.S. Appl. No. 12/563,938, filed Sep. 21, 2009, Sedarat.
U.S. Appl. No. 12/604,323, filed Oct. 22, 2009, Sedarat et al.

(Continued)

*Primary Examiner* — Siu Lee
(74) *Attorney, Agent, or Firm* — Mahamedi Paradice Kreisman LLP; Lance M. Kreisman

(57) ABSTRACT

A transceiver circuit is disclosed. The transceiver circuit comprises a receive path to receive a differential signal and a first crosstalk filter coupled to the receive path. A common-mode path is provided for carrying a common-mode signal. An RFI interference filter is coupled between the common-mode path and the receive path. Isolation circuitry decouples the RFI interference filter from the first crosstalk filter.

19 Claims, 10 Drawing Sheets

U.S. PATENT DOCUMENTS

| | | |
|---|---|---|
| 6,683,913 B1 | 1/2004 | Kantschuk |
| 6,690,739 B1 | 2/2004 | Mui |
| 6,711,207 B1 | 3/2004 | Amrany et al. |
| 6,734,659 B1 | 5/2004 | Fortner |
| 6,771,720 B1 | 8/2004 | Yang et al. |
| 6,924,724 B2 | 8/2005 | Grilo et al. |
| 6,959,056 B2 | 10/2005 | Yeap et al. |
| 6,999,504 B1 | 2/2006 | Amrany et al. |
| 7,026,730 B1 | 4/2006 | Marshall et al. |
| 7,031,402 B2 | 4/2006 | Takada |
| 7,123,117 B2 | 10/2006 | Chen et al. |
| 7,164,764 B2 | 1/2007 | Zimmerman et al. |
| 7,173,992 B2 | 2/2007 | Frigon |
| 7,180,940 B2 | 2/2007 | Li et al. |
| 7,200,180 B2 | 4/2007 | Verbin et al. |
| 7,315,592 B2 * | 1/2008 | Tsatsanis et al. ............. 375/346 |
| 7,333,603 B1 | 2/2008 | Sallaway et al. |
| RE40,149 E | 3/2008 | Vitenberg |
| 7,440,892 B2 | 10/2008 | Tamura |
| 7,457,386 B1 | 11/2008 | Phanse |
| 7,459,982 B2 | 12/2008 | Miao |
| 7,492,840 B2 | 2/2009 | Chan |
| 7,522,928 B2 | 4/2009 | O'Mahony |
| 7,542,528 B1 | 6/2009 | Cheong |
| 7,634,032 B2 | 12/2009 | Chu et al. |
| 7,656,956 B2 | 2/2010 | King |
| 7,706,434 B1 | 4/2010 | Farjadrad |
| 7,708,595 B2 | 5/2010 | Chow et al. |
| 8,094,546 B2 | 1/2012 | Schenk |
| 2003/0186591 A1 | 10/2003 | Jensen et al. |
| 2003/0223488 A1 | 12/2003 | Li et al. |
| 2003/0223505 A1 | 12/2003 | Verbin et al. |
| 2004/0010203 A1 | 1/2004 | Bibian et al. |
| 2004/0023631 A1 | 2/2004 | Deutsch et al. |
| 2004/0239465 A1 | 12/2004 | Chen et al. |
| 2004/0252755 A1 | 12/2004 | Jaffe et al. |
| 2005/0018777 A1 | 1/2005 | Azadet |
| 2005/0025266 A1 | 2/2005 | Chan |
| 2005/0053229 A1 | 3/2005 | Tsatsanis et al. |
| 2005/0123081 A1 | 6/2005 | Shirani |
| 2005/0203744 A1 | 9/2005 | Tamura |
| 2006/0018388 A1 | 1/2006 | Chan |
| 2006/0159186 A1 | 7/2006 | King |
| 2006/0182014 A1 | 8/2006 | Lusky et al. |
| 2007/0014378 A1 | 1/2007 | Parhi et al. |
| 2007/0081475 A1 | 4/2007 | Telado et al. |
| 2007/0146011 A1 | 6/2007 | O'Mahony et al. |
| 2007/0192505 A1 | 8/2007 | Dalmia |
| 2007/0280388 A1 | 12/2007 | Torre et al. |
| 2008/0089433 A1 | 4/2008 | Cho et al. |
| 2008/0095283 A1 | 4/2008 | Shoor et al. |
| 2008/0107167 A1 | 5/2008 | Tung et al. |
| 2008/0160915 A1 | 7/2008 | Sommer et al. |
| 2008/0198909 A1 | 8/2008 | Tsatsanis et al. |
| 2009/0061808 A1 | 3/2009 | Higgins |
| 2009/0097401 A1 | 4/2009 | Diab |
| 2009/0097539 A1 | 4/2009 | Furman et al. |
| 2009/0154455 A1 | 6/2009 | Diab |
| 2009/0161781 A1 | 6/2009 | Kolze |
| 2010/0046543 A1 | 2/2010 | Parnaby |
| 2010/0073072 A1 | 3/2010 | Ullen et al. |
| 2010/0074310 A1 | 3/2010 | Roo et al. |
| 2010/0086019 A1 | 4/2010 | Agazzi et al. |
| 2010/0111202 A1 | 5/2010 | Schley-May et al. |
| 2010/0159866 A1 | 6/2010 | Fudge et al. |
| 2011/0032048 A1 | 2/2011 | Wu et al. |
| 2011/0069794 A1 | 3/2011 | Tavassoli Kilani et al. |
| 2011/0106459 A1 | 5/2011 | Chris et al. |
| 2011/0256857 A1 | 10/2011 | Chen et al. |
| 2011/0293041 A1 | 12/2011 | Luo et al. |
| 2011/0296267 A1 | 12/2011 | Malkin et al. |

OTHER PUBLICATIONS

U.S. Appl. No. 12/604,343, filed Oct. 22, 2009, Farjadrad et al.
U.S. Appl. No. 12/604,351, filed Oct. 22, 2009, Sedarat et al.
U.S. Appl. No. 12/604,358, filed Oct. 22, 2009, Sedarat et al.

* cited by examiner

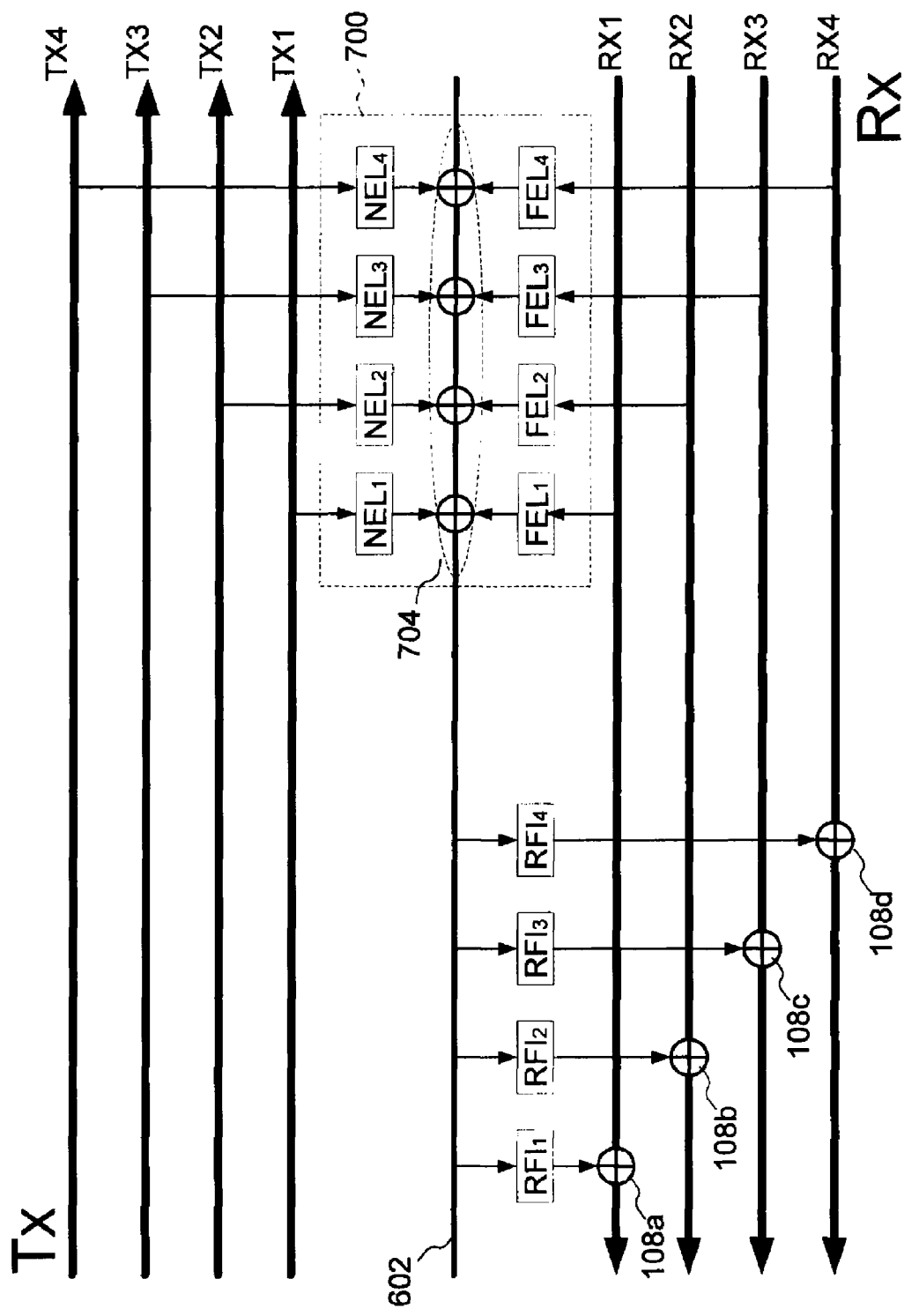

CROSSTALK CANCELLATION FOR A COMMON-MODE CHANNEL

CROSS REFERENCE TO RELATED APPLICATIONS

This application is a Continuation-in-part of U.S. application Ser. No. 12/551,396 filed Aug. 31, 2009 now abandoned, entitled "Cancellation of Alien Interference in Communication Systems", which claims the benefit of U.S. Provisional Application No. 61/099,979, filed Sep. 25, 2008, entitled, "Interference Cancellation in 10GBASE-T and Other Multi-Channel Communication Systems", U.S. Provisional Application No. 61/141,640, filed Dec. 30, 2008, entitled, "Methods and Apparatus to Detect Common Mode Signal in Wireline Communication Systems", U.S. Provisional Application No. 61/141,639, filed Dec. 30, 2008, entitled "Methods and Apparatus to Detect Common Mode Signal in Wireline Communication Systems", and U.S. Provisional Application No. 61/173,394, filed Apr. 28, 2009, entitled "Integrated Common-Mode Transformer for Detection of Electromagnetic Interference on the Channel", all of which are incorporated by reference in their entireties.

TECHNICAL FIELD

The disclosure herein relates to electronic communications, and more particularly to mitigating interference in signals transmitted over communication channels.

BACKGROUND

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from a link. The receiver detects transmitted data on the link and converts the data into a form usable by the system connected to the transceiver. For example, one widely-used network communication standard is Ethernet, including several different standards for different network bandwidths, including 10GBASE-T allowing 10 gigabit/second connections over unshielded or shielded twisted pair cables.

The IEEE 802.3an standard specifies 4 pairs of unshielded twisted copper as the communication channel in 10GBASE-T Ethernet systems. Each transceiver consists of 4 channels, each transmitting on one pair and also receiving on the same pair simultaneously. This scheme is similar to what is used in the older generation of Ethernet over copper. However, since the signal bandwidth in 10GBASE-T is much wider than the older generations, the standard recommends a better quality of cabling which offers lower insertion loss and lower crosstalk.

There are multiple sources of impairment and interference in a 10GBASE-T system which can cause significant performance degradation. These sources of impairment and interference can be broadly categorized as internal and external sources. The internal sources are caused by the link-partners themselves and imperfect channel characteristics. Examples of these sources are inter-symbol interference (ISI), echo and pair-to-pair cross-talk such as far-end crosstalk (FEXT) and near-end crosstalk (NEXT). Such noise sources are known to the link partners and thus can be cancelled effectively with cancellers and equalizers. These sources are very well characterized not only in the 10GBASE-T standard but also in the standards for older generations of Ethernet over copper. There are also well-known solutions to cancel, reject or mitigate the effects of these impairments in these standards. The signal source that causes these types of noise is known to the subject link or port experiencing the noise, and so this type of noise can be readily cancelled in that link.

Another type of impairment in 10GBASE-T systems is interference from sources external to a particular link. Examples of external interfering sources, referred to herein as alien interferers, include adjacent cross-talking Ethernet ports/links, where the noise source is from a different port or cable that is adjacent to the subject link (port) and thus the source of the interference is unknown to the subject link, and is a greater challenge to reduce than noise originating from a known source such as ISI, echo, FEXT, and NEXT. Alien interference also can include RF interference (RFI), which is produced from external unknown sources including RF interferers such as mobile phones, walkie-talkies, etc. These interferers are particularly harmful in 10GBASE-T technology because of its wide signaling bandwidth. The effects of these interference sources and methods to mitigate those effects are not widely understood, and are not well addressed or supported in existing standards. For example, the 10GBASE-T standard allows for the reduction in alien crosstalk only through a power backoff mechanism, in which signal power is reduced to reduce crosstalk if the link cable length is short enough to permit such a power reduction. However, this mechanism is not adaptable to any particular alien interference, and thus, for example, does nothing to address alien crosstalk that exists for greater signal power over long cable lengths or at backed-off power levels, nor alien interference from other sources. Consequently, alien interference sources can present difficulties for the desired performance of high bandwidth communication systems.

Accordingly, what is needed are systems and methods that reduce or cancel alien interference in channels of communication systems, providing more robust communication in such systems.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 7 illustrates one embodiment of isolation circuitry in accordance with the architecture of FIG. 6B for mitigating differential-mode induced crosstalk;

DETAILED DESCRIPTION

Embodiments of a transceiver circuit are disclosed. The transceiver circuit employs a receive path to receive a differential signal and a first crosstalk filter coupled to the receive path. A common-mode path is provided for carrying a common-mode signal. To address alien interference in the form of radio-frequency-interference, or RFI, an RFI interference filter is coupled between the common-mode path and the receiver path. Isolation circuitry decouples the RFI interference filter from the first crosstalk filter. By decoupling the RFI interference filter from the crosstalk filter, differential-mode induced noise may be suppressed from the common-mode path, thereby improving signal fidelity on the receive path. In one embodiment, the isolation circuitry comprises leakage-cancelling circuitry in the form of near-end and/or far-end adaptive filters.

In a further embodiment, a transceiver circuit is described comprising a plurality of receive paths for coupling to a plurality of physical channels. The plurality of receive paths comprise respective differential signal paths to receive respective differential signals. Crosstalk cancellation circuitry is coupled to the differential signal paths to generate compensation signals to offset crosstalk in each of the differential signal paths. At least one common-mode signal path for propagating a common-mode signal is provided. RFI cancellation circuitry is disposed between the at least one common-mode channel and each of the plurality of differential signal paths. First leakage cancellation circuitry is disposed between each of the differential signal paths and the at least one common-mode signal path.

In yet another embodiment, a method of signaling is disclosed. The method comprises receiving a differential signal; cancelling crosstalk from the differential signal; cancelling RFI from the differential signal; and decoupling the cancelling crosstalk from the cancelling RFI.

Figure 1:
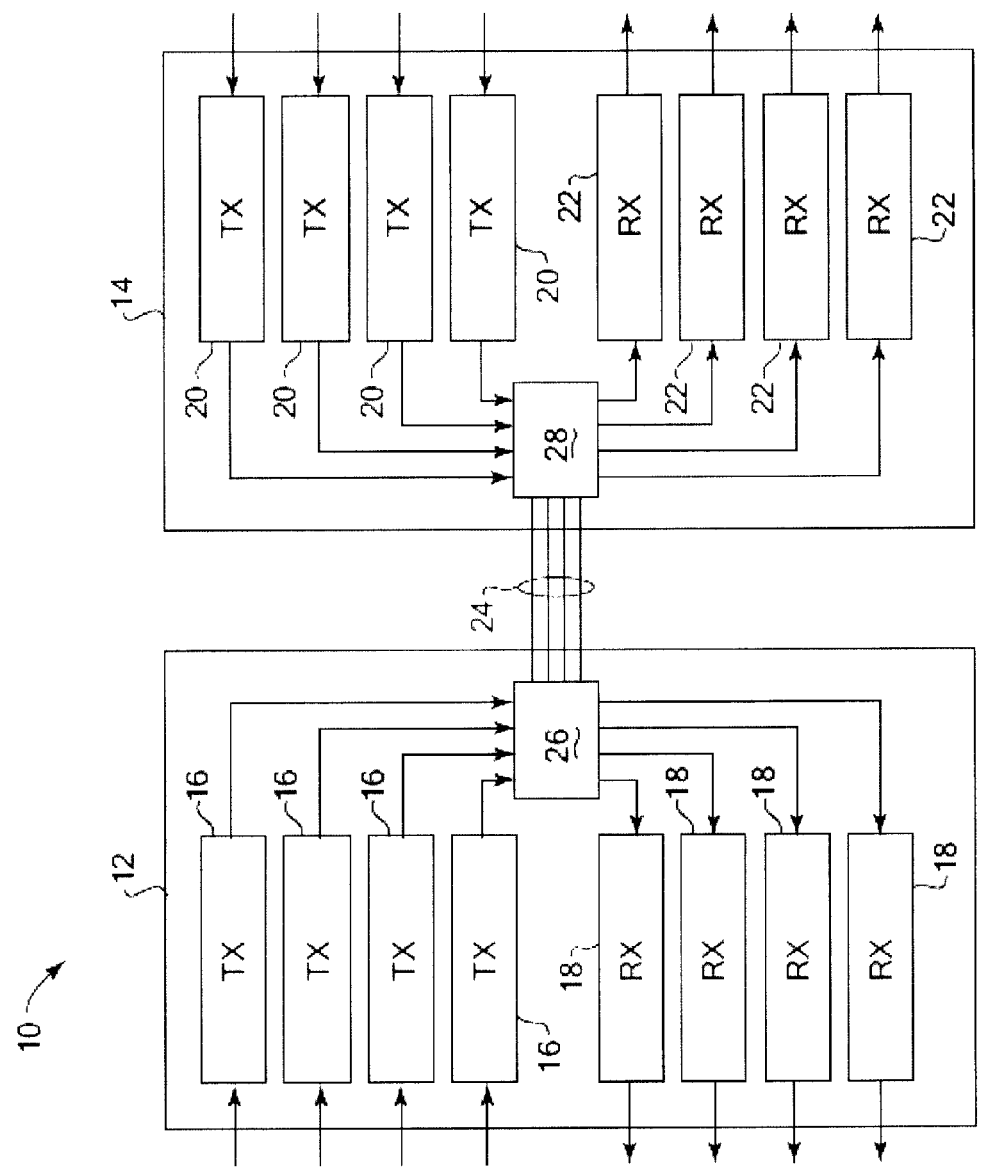
FIG. 1 illustrates one embodiment of a communication system.

FIG. 1 is a block diagram illustrating an example communication system 10 suitable for use with embodiments described herein. System 10 includes a first transceiver 12 and a second transceiver 14 which can communicate with each other. Transceiver 12 includes "transceiver components" including one or more transmitters 16 and one or more receivers 18. Similarly, transceiver 14 includes transceiver components including one or more transmitters 20 and one or more receivers 22. The transmitters 16 (and 20) shown in FIG. 1 can be considered individual "transmitters," as typically referenced herein, or can be considered individual transmitter channels which a transmitter block within the transceiver can independently transmit signals on. Similarly, receivers 18 (and 22) can be considered individual "receivers," as typically referenced herein, or can alternately be considered individual receiver channels which a receiver block within the transceiver can independently receive signals on. The transmitters 16 and 20 and receivers 18 and 22 are connected to one or more components (not shown) of a computer system, device, processor, or other "controller" associated with each respective transceiver which want to communicate data over the communication network. For example, transmitters 16 receive data and control signals from the controller connected to transceiver 12 in order to send the data over the network to other transceivers and controllers, while receivers 18 receive data from other transceivers and controllers via the network in order to provide the data to the controller connected to first transceiver 12.

The transceiver 12 can communicate with the transceiver 14 over one or more communication channels of a communication link 24. For example, the 10GBASE-T Ethernet standard provides four communication channels on the communication link 24, each channel including a twisted pair cable. Thus, in that standard, there are four transmitters 16 and four corresponding receivers 18 provided in each of the transceivers 12 and 14, each transmitter associated with one of the local near-end receivers in the same transceiver, and each such transmitter/receiver pair dedicated to one channel used for duplex communication. A transmitter/receiver pair in one transceiver 12 communicates across a channel of link 24 to a far-end transmitter/receiver pair in transceiver 14. A transmitter 16 and a receiver 22 that are connected to the same channel/link, or two transceivers connected by the communication link 24, are considered "link partners."

An interface 26 can be provided in transceiver 12 and an interface 28 can be provided in transceiver 14 to allow data transmissions between the transceivers to be routed to the appropriate transceiver blocks. For example, interfaces 26 and 28 can include transformers, and circuitry used for directing signals or data (alternatively, some or all circuitry can be included in other components, such as transmitters 16 and receivers 18).

In one example from the point of view of transceiver 12, data transmissions during normal operation from a local transmitter 16 are provided to the interface 26, which outputs the data on a corresponding channel of the communication link 24. The data is received by the link partner, the transceiver 14. The interface 28 of transceiver 14 provides the received data to its receiver 22 connected to that same channel. Furthermore, due to noise effects such as near-end crosstalk and echo, the data transmitted by transmitters 16 is also received by the near-end receivers 18 in the same transceiver. Filters can be used to filter out this noise so that the receivers 18 receive only data from other transceivers 14. In some embodiments, the transceivers 12 and 14 are asymmetric, such that data transmitted by a local transmitter has no dependence or relation with data being received by the corresponding local receiver.

Figure 2:
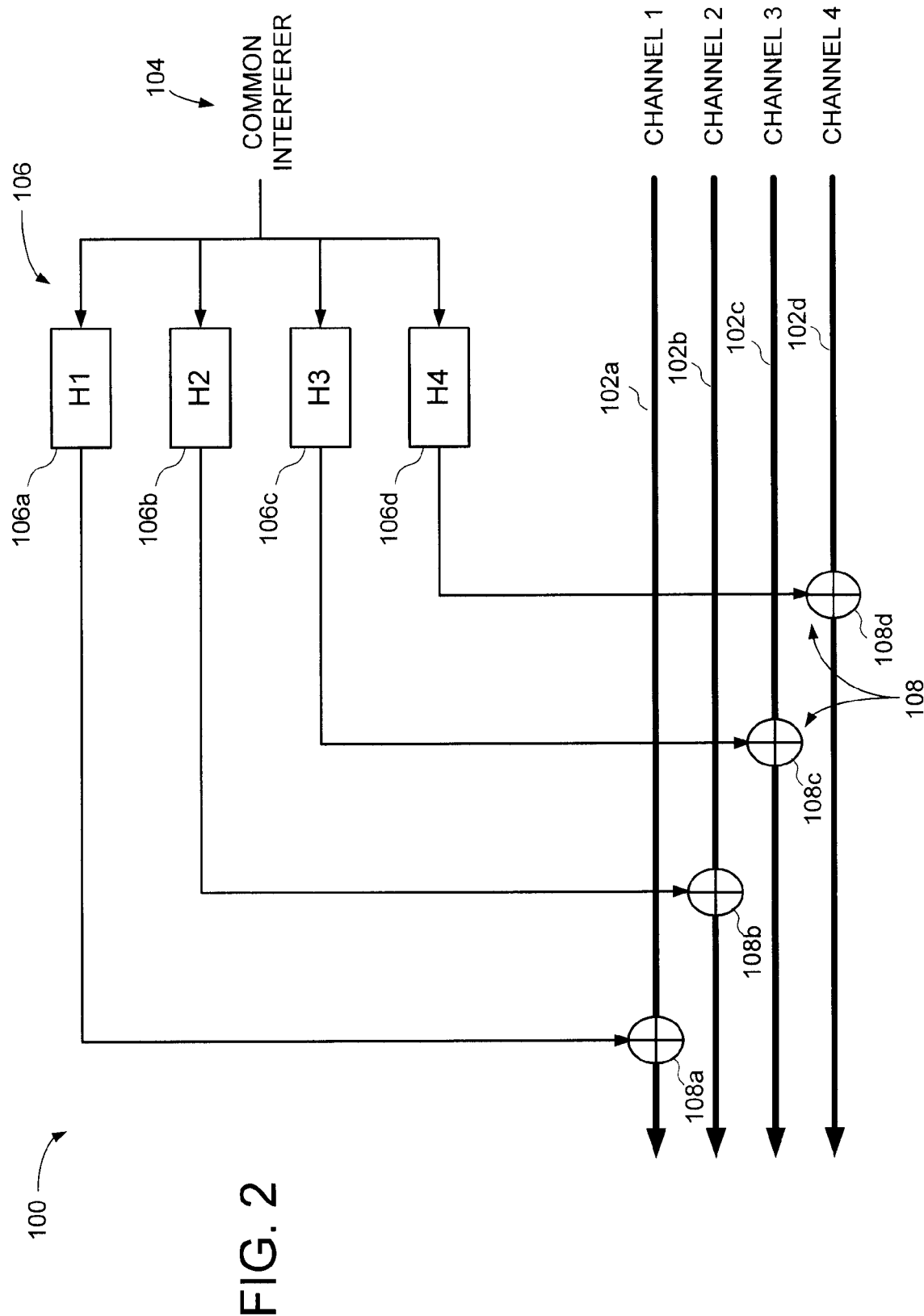
FIG. 2 illustrates one embodiment of an adaptive canceling system for canceling or reducing alien interference.

FIG. 2 is a schematic diagram illustrating one embodiment of an adaptive canceling system 100 for canceling alien interference. Herein, the term "cancel" for alien interference is intended to include cancellation of at least part of the total alien interference present, i.e. reduction of the total alien interference, or can include complete cancellation of all substantial alien interference. System 100 can be implemented in a receiver of a transceiver, such as in transceiver 12 and 14.

Communication data channels 102 are provided in the communication link to transmit and receive data from the link partners of the communication network. The example of FIG. 2 shows four communication data channels 102a, 102b, 102c, and 102d, as used in the 10GBASE-T standard. Other numbers of data channels can be used in other embodiments and according to other standards. At the right of FIG. 2, the data channels 102 can be connected to the communication link, e.g. connected to an analog front end, a hybrid, and/or a transformer provided at the transceiver which provides signals on the link and receives signals from the link. Some receiver components may also be connected to the channels 102 at the right of FIG. 2. At the left of FIG. 2, the channels 102 are connected to appropriate components in the receiver further down the receiver data paths. An example of the position of the adaptive canceling system 100 with respect to other receiver components is described below with respect to FIG. 4. In other embodiments, the components can be positioned in other locations relative to the system 100.

A common mode interferer 104 provides alien interference on the communication data channels. The system 100 provides interference cancellation through adaptive filtering and assumes that the common noise source 104 is available. The interferer 104 can be any common mode noise source that is known to provide alien interference in the communication system. For example, the common mode interferer may be an adjacent port that transmits signals causing alien crosstalk on the subject channels. Or the common mode interferer may be a radio frequency source such as walkie-talkies, radio, television, etc. For purposes of explanation, the system 100 assumes that the common mode interferer, or the resulting alien interference from the common mode interferer, is known. Techniques for determining the alien interference from the common mode interferer 104 are discussed in greater detail below.

The disclosure herein provides an adaptive filter 106 for each communication channel used in the link or communication system. Alien interference is a common mode noise that is highly correlated across all available communication channels. If the common noise source 104 or the resulting alien interference is accessible, the effect of the interference can be cancelled through a mechanism similar to cross-talk cancellation. Namely, individual adaptive filters 106 can be used to filter the noise and cancel its effect in each channel.

As shown, adaptive filters 106a, 106b, 106c, and 106d are connected to the common interferer 104 (or otherwise receive a resulting alien interference signal) and are each connected to an input of a corresponding adder 108a, 108b, 108c, or 108d. The other input of the adders 108 are the data channels 102 of the link, where channel 1 (102a) is input to adder 108a, channel 2 (102b) is input to adder 108b, channel 3 (102c) is input to adder 108c, and channel 4 (102d) is input to adder 108d. The outputs of the adders 108 are the continuation of the data channels 102, such as to other components of the receiver of the transceiver. Other embodiments can use different numbers of data channels and corresponding adders 108 and adaptive filters 106.

Each adaptive filter 106 can provide a cancellation of the interference from the source 104 similarly to cross-talk cancellation, such as Near-end and Far-end Crosstalk (NEXT/FEXT) cancellation. For example, finite impulse response (FIR) filters can be included in filters 106 to perform the alien interference cancellation. For example, in some embodiments the interference cancellation using FIR filters can be performed fully in the digital domain, where the calculated digital value of interference by each adaptive filter 106 is subtracted at the corresponding adder 108 from the corresponding incoming noisy data input on the corresponding channel 102 (which can be previously digitized by an analog to digital converter (ADC), for example) to provide a resulting signal having the interference cancelled.

Figure 3:
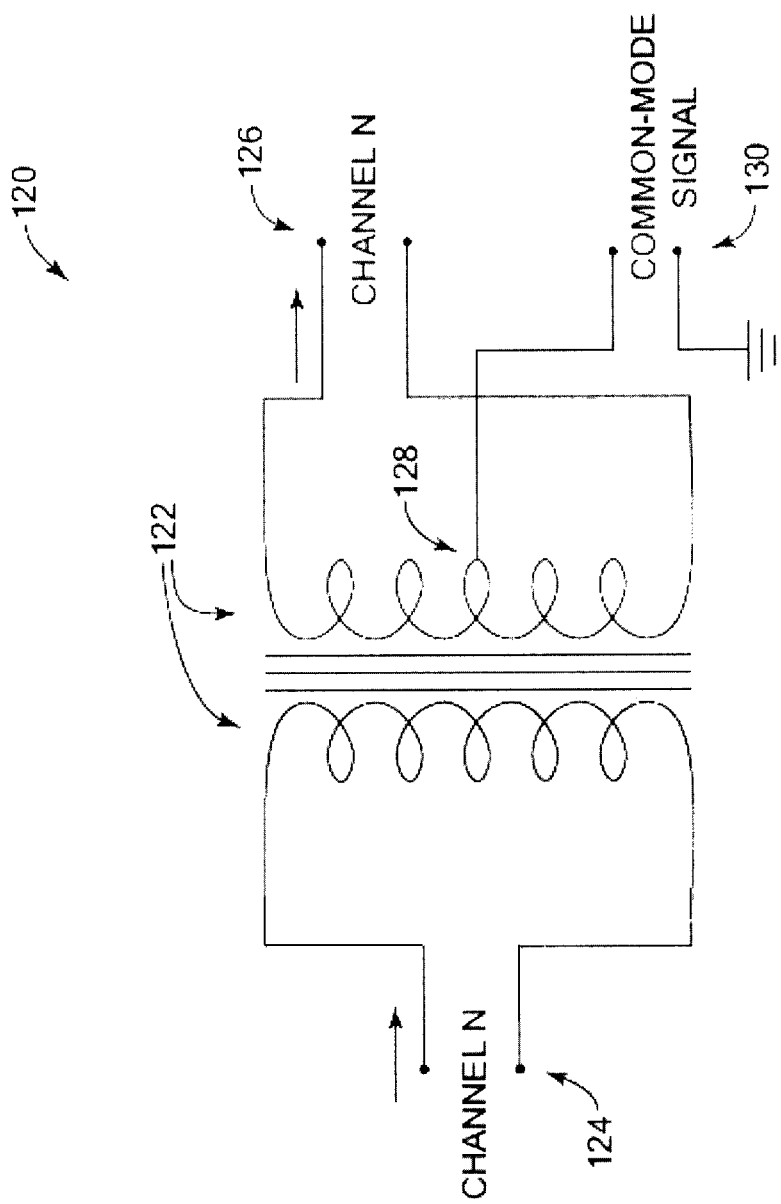
FIG. 3 illustrates one embodiment of an apparatus to provide a common-mode noise source in a communication system to allow alien interference caused by such a noise source to be determined.

FIG. 3 is a schematic diagram illustrating an embodiment of an apparatus 120 to provide a common mode noise source in a communication system to allow alien interference caused by such a noise source to be determined. In many embodiments, the common mode noise may be directly measured from a transmission channel.

In the described embodiments of FIG. 3, an additional receiver path is provided to pick up the common mode noise signal on a receive data channel, where the additional receiver path is referred to herein as an "interference path." Common mode noise is noise that is referenced to a ground and that is present on both lines of a differential pair channel. Alien interference such as alien crosstalk and RFI will appear as common mode noise on the data channels. For example, RFI will affect both lines of a twisted pair equally and in the same way, which translates to a common mode noise signal.

An ideal receiver in a transceiver can pick up only the differential signal, or difference between the two lines, and is not influenced by any common voltage between the lines. However, for real, non-ideal receivers, a portion of the common mode voltage may translate to a portion of the differential signal which the receiver picks up, causing alien interference to be present in the received data signal. Previous receivers thus did not desire to directly detect any common mode signals. In the embodiments described, however, it is desired for the receiver to intentionally read the common mode voltage so that the alien interference source can be determined and alien interference cancelled.

The embodiment of FIG. 3 detects the common mode voltage from a link transformer. In many embodiments of twisted-pair link communication systems, a coupling transformer 122 is provided at the connection point of a transceiver for each communication channel in the link. Typically, an isolation transformer is provided at both a transmitter end of each channel and at a receiver end of each channel (here, the receiver end is shown), to provide, for example, DC isolation, common mode rejection, impedance matching between dedicated drivers of the transmitter and the impedance of the cable, and balanced data transfer over the cable of the channel.

The interference path is in addition to any existing receiver paths used for data communication. For example, in a 10GBASE-T system, four receiver paths are used for data communication, one connected to each channel. Channel N is used for tapping the common mode noise signal as shown in FIG. 3, and can be any one of the existing communication channels. The interference path is a fifth receiver path used to receive and process the common mode noise signal and determine alien interference. In the described embodiment, the communication channel N is connected to the transformer in the usual way. Thus, as shown in FIG. 3, the communication link is connected to the channel N differential terminals 124, which are connected to an input at one side of the transformer. The channel N differential terminals 126 are connected to a corresponding output at other side of the transformer 122. The differential channel N terminals 126 are also connected to the standard receiver components to which the usual differential channels are connected, such as components of an analog front end as described below in the embodiment of FIG. 4.

As shown in FIG. 3, the common mode noise signal from channel N can be picked up from an interference tap, which in the described embodiment is a center tap 128 of the coupling transformer 122. The common mode noise signal is provided on terminals 130, one terminal connected to the center tap 124 and the other terminal connected to ground. This common mode noise signal can act as the alien interference from the common mode interferer 104 shown in FIG. 2. Thus, the received common mode noise signal on terminals 130 can be provided to adaptive filters 106 and the alien interference subtracted (canceled) from each of the regular communication channels 102, as shown in FIG. 2. The transformer 122 and its center tap 128 pick up the alien interference signal for use with the adaptive filters of the canceling system 100 shown in FIG. 2.

Example implementations of sensing or measuring a common mode voltage from a transformer are described in U.S.

provisional patent application Ser. Nos. 61/141,640, 61/141,639, and 61/173,394, and in copending U.S. patent application Ser. No. 12/551,340, and entitled "A Common Mode Detector for a Communication System," and U.S. patent application Ser. No. 12/551,326, and entitled "A Magnetic Package for a Communication System," all of which are incorporated herein by reference in their entireties. Any or all of the implementations described in these applications can be used in the present invention to provide a common mode signal from the transformer.

Figure 4:
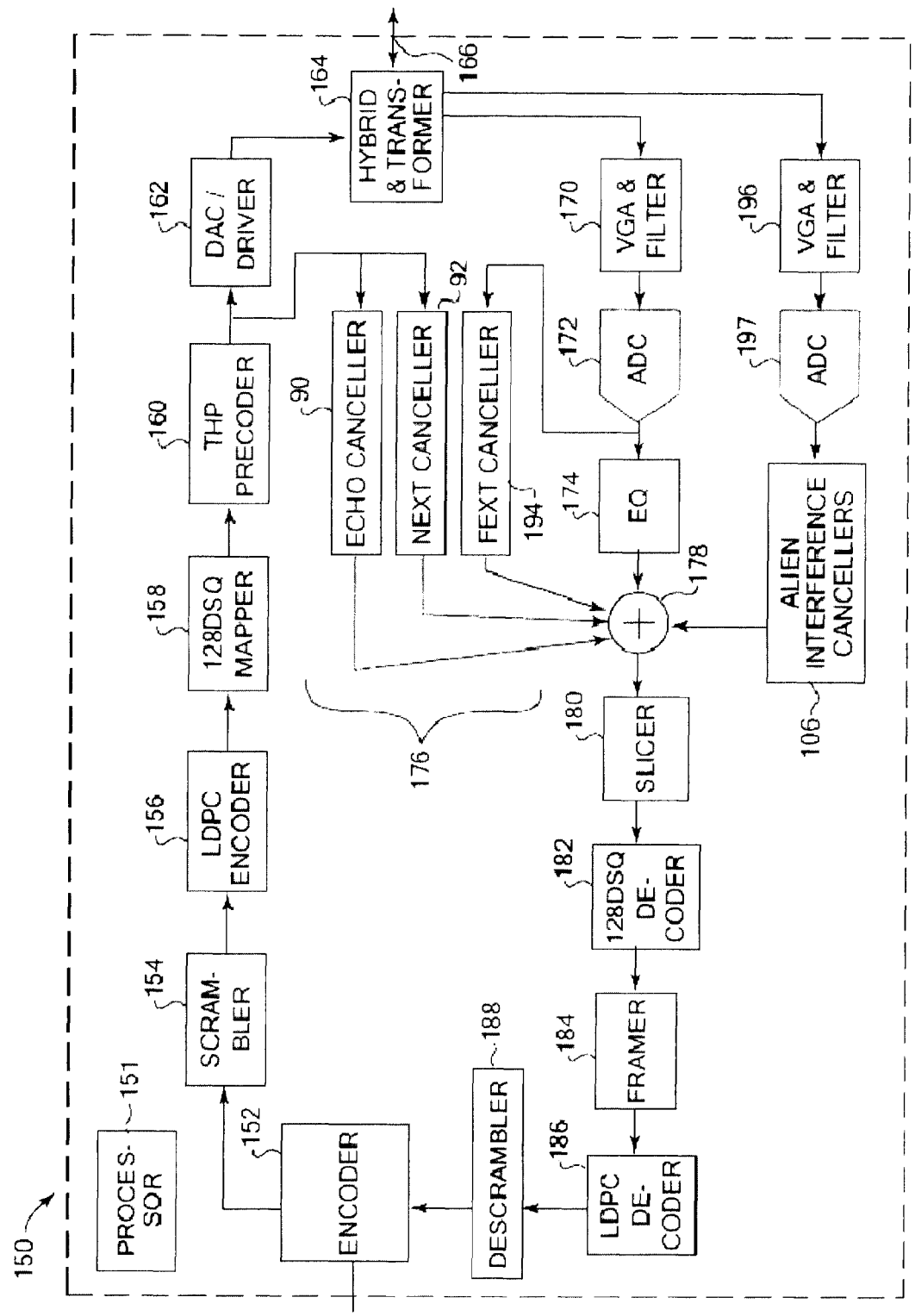
FIG. 4 illustrates one embodiment of a transceiver employing a fifth receiver path for common-mode noise detection.

FIG. 4 is a block diagram illustrating one example of a transceiver 150 suitable for use with an embodiment using a fifth receiver path (an interference path) for common mode noise detection. This example is suitable for a 10GBASE-T standard, but other different configurations and types of transceiver components can be used in other embodiments for 10GBASE-T or for other, different communication standards. For explanatory purposes, the example shown in FIG. 4 illustrates a single transmitter path/channel and a single receiver path/channel for data. Multiple such paths/channels are provided in embodiments having multiple channels, e.g. four of the transmitter paths and the receiver data paths shown in FIG. 4 are used in the 10GBASE-T standard, one path for each channel; however, only one interference path (starting with line 195) is needed for the entire transceiver 150 although many such paths can also be used and combined in various forms in other embodiments.

One or more processors 151 are typically included in transceiver 150, or connected to the transceiver 150, to control various operations for the components of the transceiver; furthermore, additional hardware and/or software/firmware can be provided to implement the components themselves and can include processor functionality.

In the transmitter portion of the transceiver, an encoder 152 can be used to encode data desired to be transmitted in a particular desired format or standard, followed by a scrambler 154 for self-synchronized scrambling of the data to be transmitted, providing clock transitions, a statistically random power spectrum for EMI (electromagnetic interference) control, equalizer convergence, etc. A low density parity check (LDPC) encoder 156 encodes the data according to the parity check for error correction. A 128DSQ mapper 158 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 160 can then adjust the signal to assist the far-end receiver in performing signal equalization. An analog front end (AFE) for the transmitter can include a digital-to-analog converter (DAC) and driver block 162 which converts the data to analog form for transmission and transmits the data via the hybrid coupler and transformer block 164 to the channel 166.

Different embodiments can implement the hybrid and transformer block 164 differently. For example, in some embodiments the transformers may be separately connected directly to the communication link, and the hybrid coupler is connected between the transformers and the rest of the transceiver components. Other embodiments may provide transformers between hybrid and the other transceiver components, or another configuration.

In a receiver portion of the transceiver 150, data is received at the hybrid coupler and transformer block 164. Four data communication channels are used in a 10GBASE-T embodiment (other amounts of channels can be used in other embodiments), and are sent to an analog front end (AFE) for the receiver which can include a variable gain amplifier (VGA) and filter 170 for filtering, and an analog-to-digital converter (A/D) 172. An equalizer block 174 can include one or more equalizers to remove inter-symbol interference (ISI). The output of the equalizer block 174 is summed with the outputs of filters 176 (described below) at adder 178, and the output of the adder can be provided to a slicer 180 which can provide an average noise level in the received signal. The signal can then be provided to a DSQ128 decoder 182, which outputs decoded data to a framer 184 that extracts frames from the received data and provides the frames to an LDPC decoder 186 which error-corrects the data. The data can then be provided to a descrambler 188 which outputs de-scrambled data to the encoder 152 for provision to a connected computer system, processor, or other device.

The filters 176 are used to reduce echo and crosstalk (NEXT and FEXT) noise which may be introduced in the transmission and reception of data over one or more of the four communication channels. Filters 176 can include an Echo canceller 190, a Near End Crosstalk (NEXT) canceller 192, and a Far End Crosstalk (FEXT) canceller 194. The filters 176 cancel out the effect of signal echo and crosstalk from adjacent lines to achieve an acceptable bit error rate. The output of the THP precoder 160 in the transmitter portion of the transceiver 150 is provided to the Echo canceller 190 and the NEXT canceller 192, which calculate the values for cancellation of echo and NEXT and output these values to the adder 78. Similarly, the output of ADC 172 is provided to the FEXT canceller 194, which calculates the values for cancellation of FEXT and outputs the values to the adder 178. The digital values of echo and crosstalk calculated by the filter are subtracted from the incoming noisy analog data (digitized by ADC 172) by adder 178 to provide received data on each channel with reduced noise.

The described embodiment also includes an additional receiver path, an interference or common-mode path, that is used for common mode noise detection, to allow the cancellation of alien interference. This path starts as a line 195 connected to the hybrid and transformer block 164 that provides a common mode signal. For example, the common mode signal can be obtained from one of the channel transformers as described above with respect to FIG. 3.

After being output from the hybrid and transformer block 164, the common mode signal on line 195 can be provided to an analog front end (AFE) that is dedicated to the common mode path, including a variable gain amplifier (VGA) and filter 196, and an analog to digital converter (ADC) 197. The output of the ADC 197 is provided to an alien interference cancellers block 106. For example, canceller block 106 can include adaptive filters 106 that receive the common mode noise signal as described above with reference to FIG. 2. The output of the alien interference cancellers block 106 is provided to associated adders, each adder on a different channel, and subtracts alien interference from the associated channel data signal provided on that receiver path. Thus, block 106 provides a canceling signal for each of the used receiver paths (only one of which is shown in FIG. 4). In the described example, the adder can be provided in the adder block 178, while in other embodiments it can be a dedicated adder separate from the block 178. For example, as shown in the embodiment of FIG. 2, each of the output cancellation signals of the adaptive filter block 106 is provided to a dedicated adder that also receives the corresponding data signal on the channel associated with that adaptive filter, and subtracts the noise associated with alien interference from the channel data signal.

As shown, the interference path used for alien interference cancellation may only require particular receiver components such as the analog front end components. Other receiver blocks are not needed, as shown in FIG. 4, and other components in the transmitter path (and used in the standard receiver paths) can also be omitted from the interference path, such as echo cancellers, NEXT cancellers, etc.

In other embodiments, the alien interference canceller 106 can output a cancellation signals to an adder provided at different locations in the sequence of receiver blocks, e.g. before the equalizers 174, after a later block such as slicer 180, decoder 182, etc.

The transceiver circuit exhibits certain signaling parameters that initially undergo a standard training sequence to achieve fully-functional nominal operation of data communication over a signaling link. The nominal operation is a predefined level of operation at which parameters are at a particular target level (such as bit error rate being under a particular target rate), and for which the transceiver can transmit and receive data over the link. The full training sequence is a predefined sequence of stages or steps known by the link partners, although the boundaries of the stages can be overlapped or blurred in some embodiments. The sequence typically occurs at a predefined point of operation, such as at startup when a transceiver is powered on or is first connected to a communication link. During nominal operation, after the full training sequence, the transceiver continues to adapt parameters (i.e. a continuous adaptation) to changing characteristics of the link based on received data. In one embodiment, more fully described in copending U.S. application Ser. No. 12/551,347, filed Aug. 31, 2009, entitled Fast Retraining For Transceivers In Communication Systems, and assigned to the assignee of the present invention, the training sequence may be shortened to reduce training time.

Creation of a Common Mode Noise Signal

In a different embodiment, the common mode noise signal used for canceling alien interference can be created based on a predetermined model and detected characteristics or parameters from the data signals received on the communication channels. In some implementations this embodiment may not provide as accurate an estimation of the alien interference, but since an additional communication channel is not needed to obtain the alien interference signal in this embodiment, it may be more practical for some communication system implementations.

In one embodiment, the common mode noise signal can be estimated by assuming a model for the common interferer and extracting the parameters of that model from the received signal on one or more of the channels receiving data. For example, in some applications the common mode noise can be assumed to be originating from a single-tone radio-frequency interferer (RFI). Such an interferer typically manifests an alien interference signal as a simple sine wave. Thus, the basic model of the common mode noise signal can be modeled and created as a sine wave. Parameters of the sine wave are also needed, such as amplitude, frequency, and phase. Amplitude and phase can be determined by adaptation using the adaptive filters 106 described above, e.g. the adaptive filters can act like a gain stage to adjust to the proper amplitude, as well as find the correct phase value. To determine the instantaneous frequency of the RFI, the frequency of the signals on some or all received channels can be examined, and the frequency common to the all the signals can be extracted or estimated. In addition, other receiver components can provide useful information, such as the slicer error provided by the slicer 80 for each channel, which can be additionally used to determine the frequency. This information is then used to create a sine-wave with the determined frequency, which is used as the alien interference signal, e.g. it is used as the input to the interfering canceller filters 106 as shown in FIG. 2.

Thus this embodiment determines a model based on the type of alien interference likely to be encountered. For example, the likely type(s) of alien interference can be determined with tests and/or training performed prior to actual operation. Then parameters of the specific alien interference currently being encountered can be extracted based on the current data signals being received on the communication channels, and/or determined by the filters 106. Such parameters can include signal frequency, phase, amplitude, etc.

This common mode signal creation embodiment has the advantage of not requiring an additional receiver path to implement, saving cost and implementation. For example, referring to the receiver in the transceiver 150 of FIG. 4, the common mode signal creation embodiment would not need to replicate the additional receiver path including the line and analog front end components 195, 196 and 197, and only needs to use the alien interference cancellers 106 which are provided the estimated alien interference signal from a processor or other controller in the receiver that estimates the signal, such as processor 151.

Figure 5:
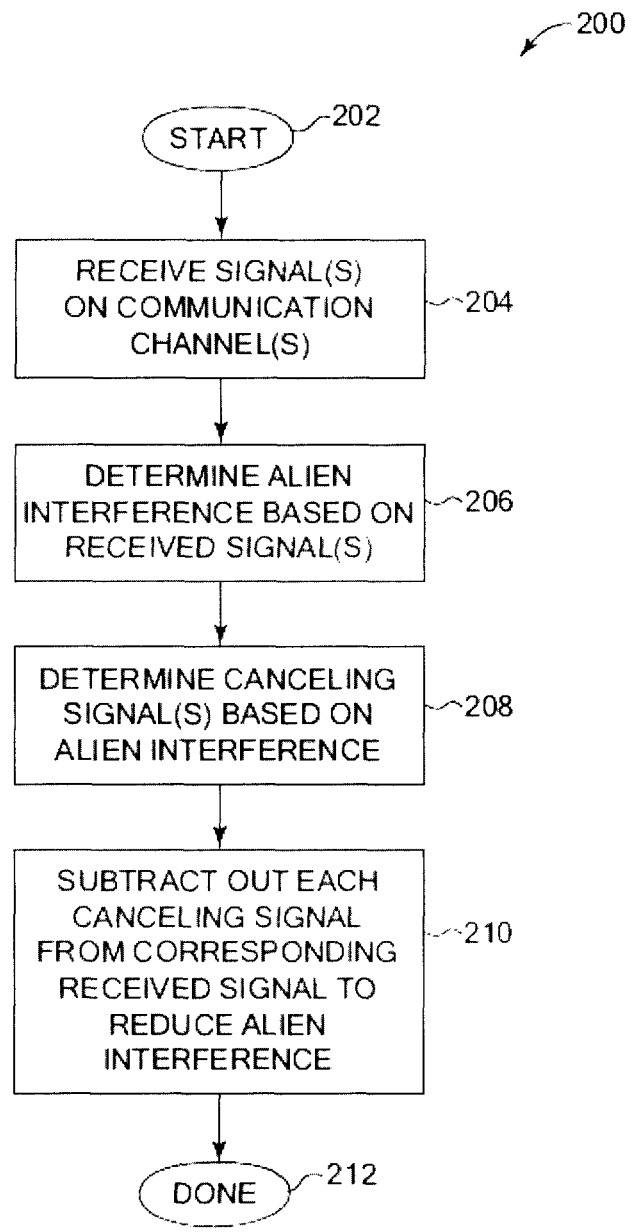
FIG. 5 is a flow diagram illustrating one embodiment of a method of providing alien interference cancellation for a receiver.

FIG. 5 is a flow diagram illustrating one embodiment of a method 200 for providing cancellation of alien interference for a receiver. Method 200 can be implemented by one or more processors (such as processor(s) 151) provided in a transceiver or connected to a transceiver (such as in a connected computer system or electronic device), and can be implemented using hardware, software, or both hardware and software. The method can be implemented using a computer program product accessible from a computer readable medium providing program instructions or code for use by or implemented by a computer system or processor. A computer readable medium can be any apparatus that can contain, store, communicate, propagate, or transport the program for use by or in connection with the processor or computer system. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk (CD-ROM, DVD, etc.).

The method begins at 202, and in step 204, signal(s) are received by the transceiver on the communication channels. For example, in a 10GBASE-T system, data signals can be received on four data communication channels. In some embodiments, an additional interference channel may be used in order to determine the alien interference. In step 206, the method determines the alien interference, i.e., interference caused by a common interferer, based on one or more of the received signal(s). As described above, the alien interference can be determined differently in different embodiments. In some embodiments, a common mode noise signal (i.e. alien interference signal indicating the alien interference) can be directly obtained using an additional, interference receiver path, while in other embodiments the common mode noise signal can be estimated and created based on a model of the interference and obtained parameters from the data signals, as described above.

In step 208, the method determines canceling signals based on the alien interference. For example, as described above with reference to FIG. 2, the canceling signals can be provided by adaptive filters receiving an alien interference signal. In step 210, the canceling signals are subtracted from corresponding received data signals on data channels to cancel alien interference in the data signals. For example, as described above with reference to FIG. 2, each filter 106 provides a canceling signal to an associated adder 108 which also receives the corresponding data signal on the data channel 102, and the output of the adder outputs the resulting data signal having the alien interference subtracted out. The process is then complete at 212.

Examples of Test Results

Tests were performed to determine the effects of RF interference on a PHY (physical layer device) for Ethernet 10GBASE-T communications. In one test, a cable clamp was used to inject a sine-wave signal as interference over a 100 meter channel. Frequencies within a bandwidth of less than 400 MHz were used. The RFI was injected in one patch cord closer to the Master. The effect of RFI was seen on the LDPC iteration at about −0 dBm of signal-generator output power. The link failed when the power was increased to 0 dBm. The signal-generator could output a maximum power of 14.5 dBm.

According to the tests, if the link were established without RFI, it would fail with an injection of about 0 dBm of RFI. The signal-to-noise ratio (SNR) degrades significantly and adapting the filters only helped slightly, but not enough to keep the link operating. Speeding up the filter adaptation did not help significantly.

With an RFI present during the startup of the communication link, the link could be established with a good success rate even at the maximum RFI power. The THP precoder in the transmitter provided the resiliency to the RFI. The signal-to-noise ratio (SNR) did not degrade significantly. Turning off the RFI and turning it back on did not hurt the link. However, PHY architectures that have preset THP coefficients based on cable length would not be able to compensate for the RFI during training.

If an additional (e.g. fifth) receiver path is used to pick up the common mode RFI or alien crosstalk, the interference can potentially be cancelled without losing the link, even if the interference shows up after filter training. In one embodiment, the additional receive path does not include echo cancellers or other transmitter cancellers and includes four additional finite impulse response filters (FIRs), similar to crosstalk cancellers. These filters take common mode noise, such as RFI or alien crosstalk, and cancel it across all four main channels.

For example, with no RFI, the SNR in the test setup was ranged from 27 to 29 dB. In the presence of a 100 MHz RFI during startup, the equalizers converged to a very nice solution which blocked the RFI considerably but did not impact the SNR significantly, e.g., the SNR ranged from 27 to 28 dB. If the THP precoding is fixed and not adaptable, and is optimized for no RFI, the FFE (feed-forward equalizer) by itself had a tough time balancing the RFI rejection with noise and inter-symbol interference (ISI) enhancement, e.g., the SNR ranged from 13 to 20 dB. If the far-end on one channel is turned off and that receiver path/channel is used as a reference to cancel the RFI on the other three channels (similarly as explained above with reference to FIGS. 2 and 3), then there was very good rejection with virtually no SNR penalty, e.g., the SNR ranged from 27 to 29 dB, using the second channel as the reference (which had 3 dB SNR).

The embodiments described above provide significant advantages for canceling alien interference for transceivers on a communication network, and address the reduction of alien interference directly, for all configurations and implementations of a network. This allows less noise and more accurate reception of data at a receiver in a communication system.

Common-Mode Crosstalk Cancellation

Figure 6A:
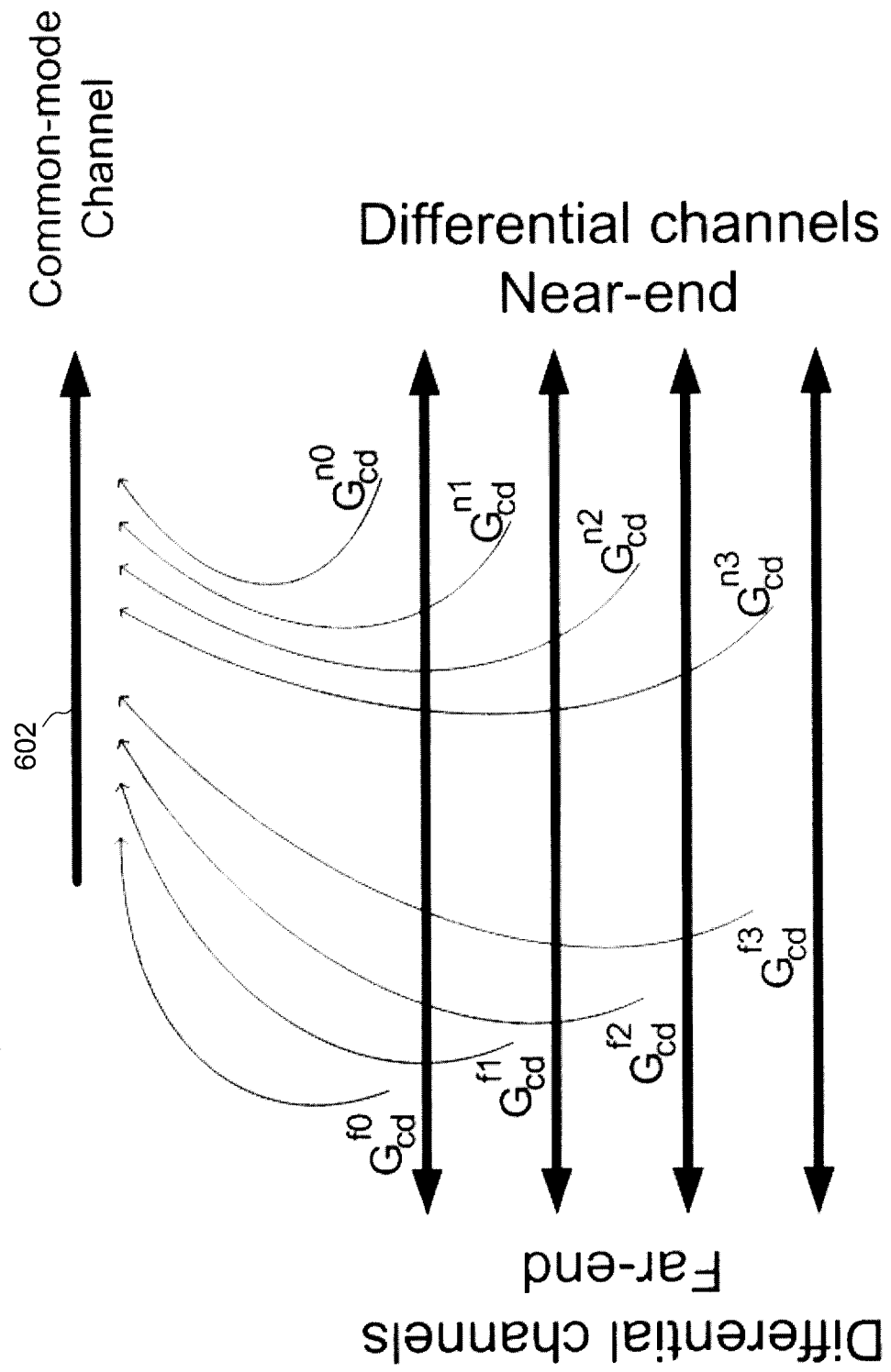
FIG. 6A illustrates differential-mode crosstalk induced on the common-mode channel shown in FIG. 4.

Referring now to FIG. 6A, employing a common-mode path, such as that shown at 602, in order to detect and cancel alien interference, such as RFI, presents significant benefits. The inventor has discovered, however, that in some circumstances, the common-mode channel itself may experience noise from the differential channels in the form of differential-mode noise. The noise may be expressed in terms of near end (n) and far end (f) frequency-dependent gain components $Gcd_{n0}$-$Gcd_{n3}$ and $Gcd_{f0}$-$Gcd_{f3}$ from the differential-mode channels to the common-mode channel 602. The near-end gain components result from leakage due to the differential transmit paths, while the far-end gain components result from leakage due to the differential receive paths.

In a further embodiment, signal fidelity for the differential receive path(s) may be further improved by virtually "isolating" or decoupling the RFI cancellation circuitry 108a-108d (FIG. 2) from the crosstalk cancellation circuitry (FEXT filter 194, NEXT filter 92 and echo filter 90, FIG. 4) as well as the equalizers, thereby compensating for "leakage", or differential-mode induced noise on the common-mode channel 602.

Figure 6B:
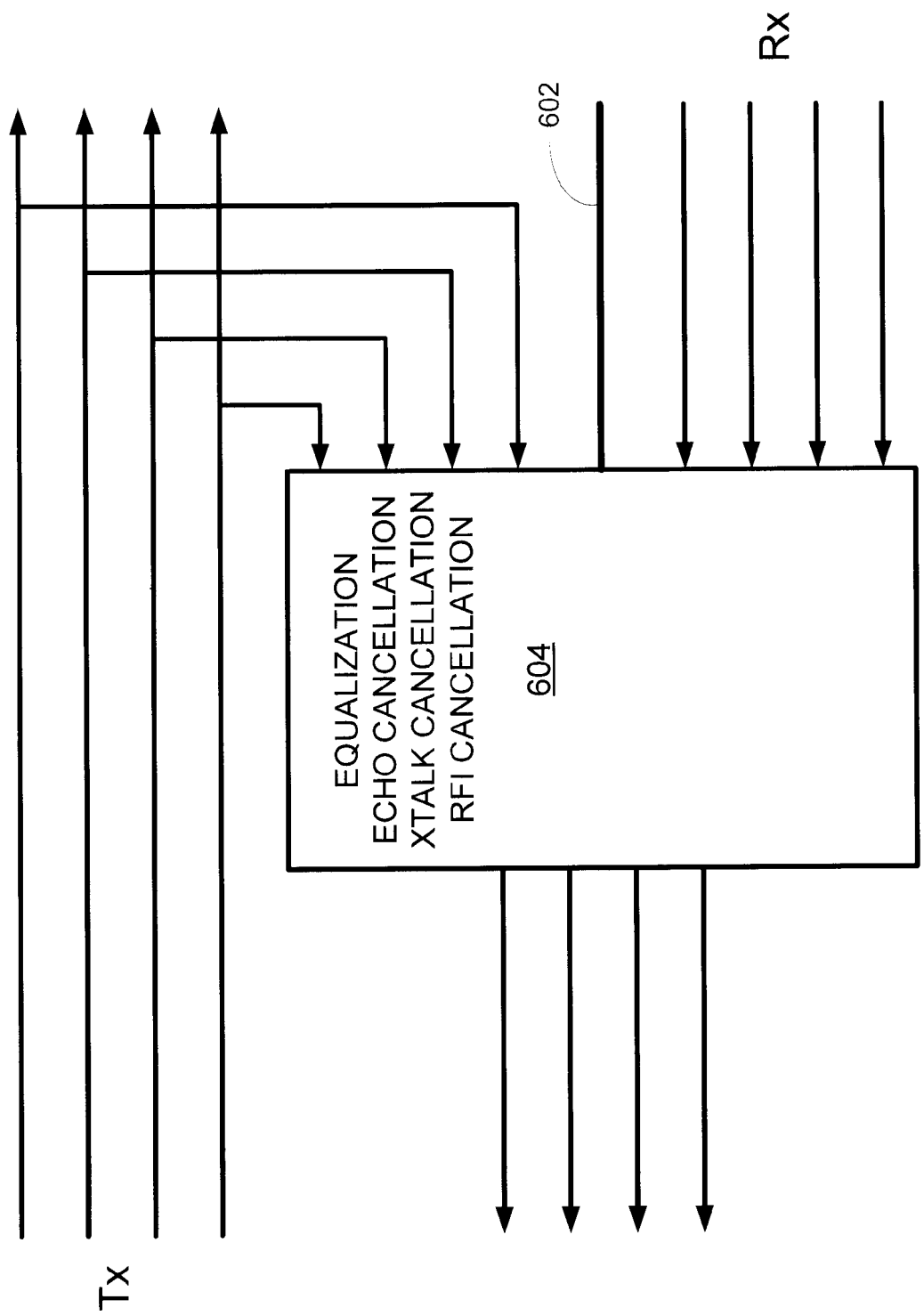
FIG. 6B illustrates a high-level block diagram of one embodiment of a filter architecture to address the crosstalk of FIG. 6A.

FIG. 6B illustrates a high-level embodiment of a filter architecture that employs leakage cancellers in the form of adaptive filters to cancel the leakage from near-end and far-end transmitters into the common-mode channel 602. The cancellers are employed in a filter circuit 604 that also employs filters to carry out echo cancellation, crosstalk cancellation, RFI cancellation and equalization.

Referring now to FIG. 7, one embodiment of the isolation circuitry, generally designated 700, compensates for leakage by utilizing adaptive filters in the form of near-end leakage filters $NEL_1$-$NEL_4$ and far-end leakage filters $FEL_1$-$FEL_4$. The leakage filters adaptively decouple the echo filter 90, FEXT filter 194, NEXT filter 92, and equalizer from RFI filters RFI1-RFI4 (corresponding to RFI cancellation circuitry 108a-108d in FIG. 4). To carry this decoupling out, each near-end leakage adaptive filter (NEL) includes an input tied to one of the transmit paths TX and an output coupled to a summing node 704 on the common-mode path 602. Similarly, each far-end leakage adaptive filter (FEL) is disposed between each receive path RX and the common-mode path 602. The near-end and far-end adaptive filters are illustrated with respect to the RFI adaptive filters $RFI_1$-$RFI_4$, and may be embodied as any form of frequency or time-domain digital filter, such as FIR (finite impulse response) filters, IIR (infinite impulse response) filters, or the like.

As in the case of the echo, NEXT and FEXT cancellers 90, 92 and 194, each of the leakage adaptive filters NEL and FEL provides a continuous adaptation based on initially preset or trained filter coefficients. The coefficients are set based on the anticipated differential-mode induced noise signals that are to be filtered. Feedback in the form of one or more error signals allows each filter to adaptively converge to a desired transform function which allows the generation of common-mode crosstalk cancellation signals for application to signals on the common-mode channel 602.

Figure 8:
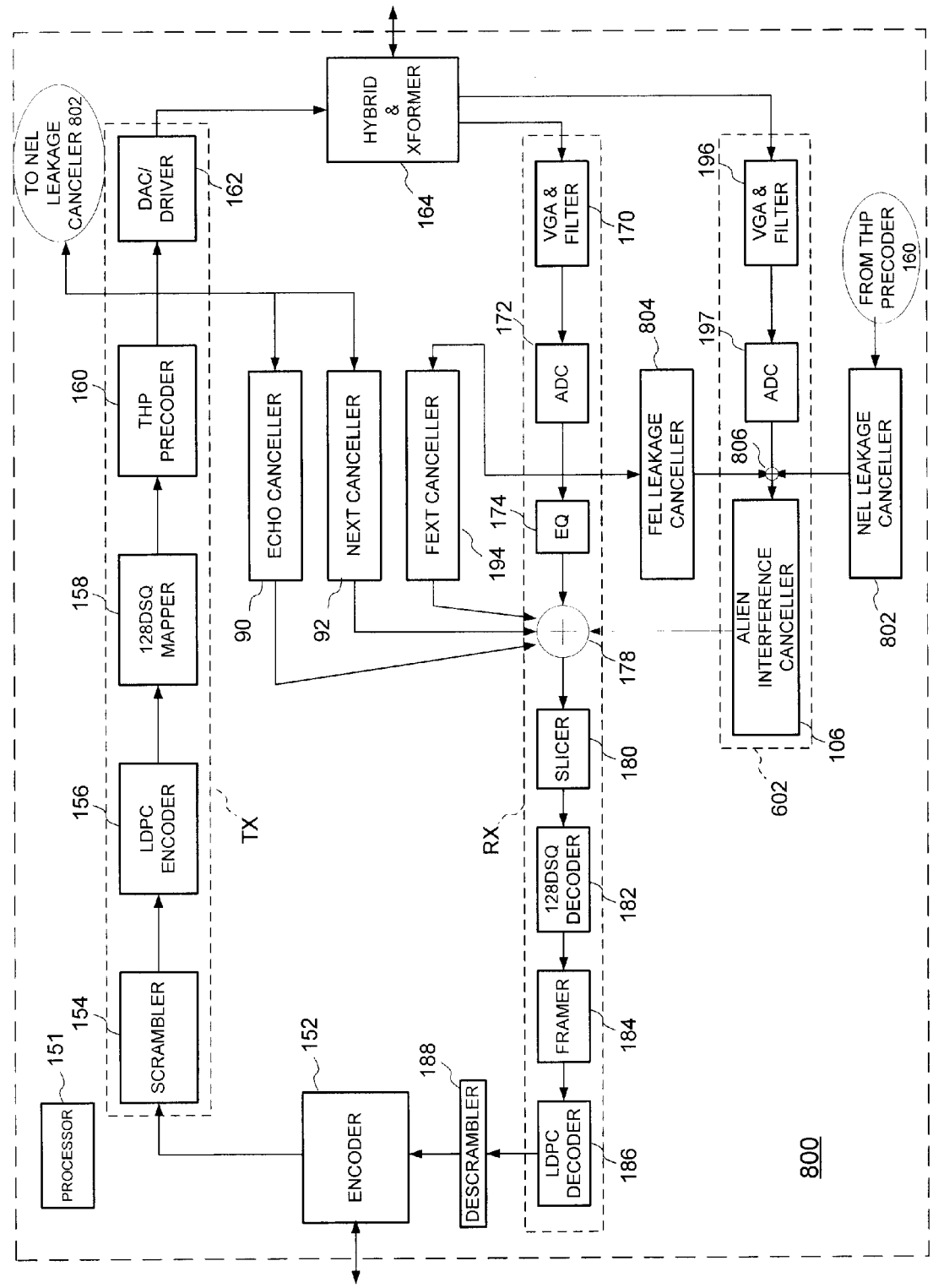
FIG. 8 illustrates an embodiment of a transceiver employing the isolation circuitry of FIG. 7.

FIG. 8 illustrates a block diagram of one embodiment of a transceiver circuit, generally designated 800, that employs the isolation circuitry 700 described above. For purposes of clarity, only one transmit path (shown in phantom as $TX_N$) and receive path (shown in phantom as $RX_N$) are shown, with the understanding that a given transceiver circuit may employ multiple transmit and receive paths. For high-speed ethernet applications, such as 10GBASE-T, four twisted-pair paths are employed as bidirectional transmit and receive paths. The transceiver circuit is similar to that of FIG. 4, but includes provisions for a near-end leakage canceller 802 and far-end leakage canceller 804.

With continued reference to FIG. 8, the transmit path $TX_N$ generally includes an encoder 152, scrambler 154, LDPC encoder 156, 128DSQ mapper 158, THP precoder 160 and DAC/driver 162, all of which have been previously described with respect to FIG. 4. Echo canceller 90 and NEXT canceller 92 provide adaptive filtering from the output of the THP precoder 160 for basic reflections and near-end crosstalk associated with the respective differential-mode transmit channels. To isolate the echo canceller 90 and NEXT canceller 92 from the alien interference, or RFI canceller 106, the output of the THP precoder 160 is also fed to the input of near-end leakage canceller 802. The near-end leakage canceller 802 generates a cancellation signal for application to a common-mode summing node 806 disposed in the common-mode path 602. As explained above, the near-end leakage canceller 802 provides adaptive filtering between the transmit path $TX_N$ and the common-mode path 602 to mitigate the effects of differential-mode induced noise from the transmit path to the common-mode path.

Further referring to FIG. 8, the receive path $RX_N$ generally includes VGA & filter 170, analog-digital converter (ADC) 172, equalizer (EQ) 174, summing node 178, slicer 180, 128DSQ decoder 182, framer 184, and LDPC decoder 186, all of which were previously described with respect to FIG. 4. As explained earlier, FEXT canceller 194 provides basic crosstalk cancellation associated with other differential-mode receive channels. The EQ also provides equalization for the main differential-mode receive channel. However, to isolate the equalizer and FEXT canceller 194 from the RFI canceller 106, the output from the ADC 172 is also fed to the input of far-end leakage canceller 804. The far-end leakage canceller 804 provides adaptive filtering between the receive path $RX_N$ and the common-mode path 602 to mitigate the effects of differential-mode induced noise from the receive path to the common-mode path.

Figure 9:
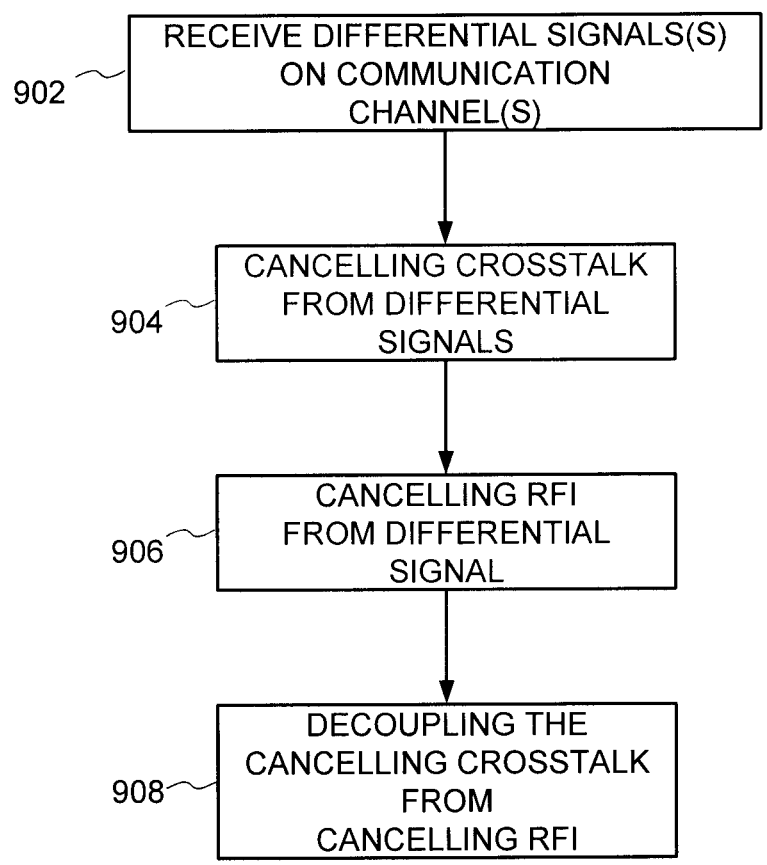
FIG. 9 is a flow diagram illustrating a method of providing crosstalk cancellation on a common-mode channel.

Operation of the transceiver circuit of FIG. 8 is similar overall to that of the embodiment of FIG. 4, but with the additional compensation afforded by the leakage isolation circuitry. FIG. 9 provides a high-level flowchart setting forth basic steps involved in a method of operating the transceiver circuit to effect the leakage or common-mode crosstalk cancellation. The method begins, at step 902, by receiving differential-mode signals on the receive path channels RX1-RX4. Echo signals, and crosstalk from between the various differential-mode channels is cancelled by the echo canceller 90, NEXT canceller 92, and FEXT canceller 194, at step 904. RFI is also cancelled, at step 906, by sensing a common-mode signal from at least one of the differential-mode channels, and adaptively filtering the signal on the common-mode path 602 to identify and generate an RFI cancelling signal for application to each of the receive paths. At step 908, the differential-mode crosstalk cancellation operations and RFI cancellation operations are decoupled or isolated by filtering near-end and far-end leakage from the differential-mode channels to the common-mode channel. With the RFI filtering operations effectively decoupled or isolated from the NEXT and FEXT crosstalk cancelling functions, a more accurate RFI cancellation process is realized, with improved overall receive signal fidelity.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A transceiver circuit comprising:
a receive path to receive a differential signal;
a first crosstalk filter coupled to the receive path;
a common-mode path for carrying a common-mode signal;
a radio frequency interference filter coupled between the common-mode path and the receive path; and
isolation circuitry that comprises an adaptive filter to decouple the radio frequency interference filter from the first crosstalk filter.

2. The transceiver circuit according to claim 1 wherein:
the adaptive filter is a leakage adaptive filter.

3. The transceiver circuit according to claim 2 wherein the leakage adaptive filter generates a cancellation signal to compensate for differential-mode induced noise in the common-mode signal.

4. The transceiver circuit according to claim 3 wherein the leakage adaptive filter is disposed between the common-mode path and the receive path, and the cancellation signal compensates for far-end differential mode induce noise.

5. The transceiver circuit according to claim 2 and further comprising a transmit path.

6. The transceiver circuit according to claim 5 wherein the isolation circuitry further comprises a near-end leakage adaptive filter disposed between the transmit path and the common-mode path.

7. The transceiver circuit according to claim 1 wherein the first crosstalk filter comprises at least one of a near-end adaptive crosstalk filter and a far-end adaptive crosstalk filter.

8. The transceiver circuit according to claim 1 wherein the common-mode signal is based on the differential signal.

9. The transceiver circuit according to claim 8 wherein the common-mode signal comprises a detected common-mode component of the differential signal.

10. The transceiver circuit according to claim 1 and embodied in a 10GBASE-T transceiver integrated circuit chip.

11. A transceiver circuit comprising:
a plurality of receive paths for coupling to a plurality of physical channels, the plurality of receive paths comprising differential signal paths to receive respective differential signals;
crosstalk cancellation circuitry coupled to the differential signal paths to generate compensation signals to offset crosstalk in each of the differential signal paths;
at least one common-mode signal path for propagating a common-mode signal;
RFI cancellation circuitry disposed between the at least one common-mode channel and each of the plurality of differential signal paths; and
first leakage cancellation circuitry disposed between each of the differential signal paths and the at least one common-mode signal path.

12. The transceiver circuit according to claim 11 wherein the first leakage cancellation circuitry generates far-end leakage cancellation signals to compensate for far-end differential-mode noise on the common-mode path.

13. The transceiver circuit according to claim 11 and further comprising a plurality of transmit paths, and second leakage cancellation circuitry disposed between the at least one common-mode path and the plurality of transmit paths, and wherein the second leakage cancellation circuitry generates near-end leakage cancellation signals to compensate for near-end differential-mode noise on the common-mode path.

14. The transceiver circuit according to claim 11 embodied as an integrated circuit chip.

15. A method of signaling comprising:
receiving a differential signal;
cancelling crosstalk from the differential signal on a receive path;
cancelling RFI from the differential signal on a common mode path; and
decoupling the cancelling crosstalk from the cancelling RFI between the receive path and common mode path by leakage adaptive filters.

16. The method according to claim 15 wherein the cancelling crosstalk comprises adaptively filtering.

17. The method according to claim 16 wherein the cancelling RFI comprises detecting a common-mode component of the differential signal and adaptively filtering the common-mode component on a common-mode path to generate an RFI cancellation signal.

18. The method according to claim 17 wherein the decoupling the cancelling crosstalk from the cancelling RFI comprises adaptively filtering between the common-mode path and the receive path and generating a far-end leakage cancellation signal.

19. The method according to claim 15 and further including transmitting a differential signal along a transmit path, and wherein the decoupling comprises adaptively filtering between the common-mode path and the transmit path and generating a near-end leakage cancellation signal.

* * * * *